United States Patent [19]

Legris

[11] Patent Number: 4,563,822

[45] Date of Patent: Jan. 14, 1986

[54] LEVEL DEVICE FOR MASONRY WORK

[76] Inventor: Marcel Legris, Place de la Parette Air Bel Bt. 48, 13011 Marseille, France

[21] Appl. No.: 590,304

[22] Filed: Mar. 16, 1984

[30] Foreign Application Priority Data

Mar. 18, 1983 [FR] France ................................ 83 04618

[51] Int. Cl.⁴ ............................................... G01C 5/04
[52] U.S. Cl. .................................. 33/367; 73/432 HA
[58] Field of Search ............ 33/366, 367; 73/432 HA, 73/723; 340/612

[56] References Cited

U.S. PATENT DOCUMENTS

| | | | |
|---|---|---|---|
| 3,269,023 | 8/1966 | Calkins | 33/367 X |
| 3,310,880 | 3/1967 | Watts | 33/367 |
| 3,645,135 | 2/1972 | Hadley | 33/367 |
| 4,379,367 | 4/1983 | Legris | 33/367 |
| 4,384,410 | 5/1983 | Melugin et al. | 33/367 |

Primary Examiner—William D. Martin, Jr.
Attorney, Agent, or Firm—Karl W. Flocks; Sheridan Neimark; A. Fred Starobin

[57] ABSTRACT

A level device is designed to determine different levelling points in building work to automatically set certain parts, such as the suspension systems for false ceilings when this apparatus is fitted with a bolt-driving attachment, comprising a flexible tube connected to a first chamber closed by a first diaphragm offering very low resistance to the liquid contained, the other end of the tube connected to a second chamber closed by a second diaphragm which second diaphragm offers resistance to the liquid contained and compresses the air contained in the corresponding space whereby in turn this air actuates a diaphragm which has needle-type contact switches, on each side, these circuits to an indicator, with a valve used to locate the apparatus at a point which may be at a higher or lower level than that determined by the first diaphragm.

9 Claims, 5 Drawing Figures

LEVEL DEVICE FOR MASONRY WORK

The present invention concerns an improved level device of the communicating vessels type, using electrical or electronic sensors to check, determine and measure horizontally and to control an apparatus for adjusting suspended ceilings or for any other work of this type.

In existing devices of this type, it is the level of a liquid in two flasks connected by a tube which indicates the required position. To make reading easier, certain of these instruments are sometimes completed by an electric level control device using two electrodes forming an electrical connection on contact with water, this closed circuit actuating a light signal or audible warning. In German Pat. No. 2,711,620, electrical resistances are used which vary with the level of the liquid. In U.S. Pat. No. 3,779,084, the pressure of the liquid compresses a diaphragm connected with a switch. This circuit feeds a light signal and indicates the depth to which the bucket of a mechanical excavator has descended. As a general rule, these levels cannot be validly used for masonry work, it being impossible for them to be turned in every direction as the air would become mixed with the liquid used. This is also the case for Belgian Pat. No. 550,572. In French Pat. No. 2,465,198, the whole hydraulic circuit is rendered tight by means of two diaphragms connected to electrical or electronic sensors. The drawback of this level lies in the fact that the diaphragms offer resistance to movement of the liquid and, as the required level is approached, oscillate over just a few microns. Because of this, the slightest variations in the apparent volume of the liquid, for various reasons and no matter how small, continually falsify the setting and oblige continuous recalibration of the apparatus. The ambiguity of the electrical signals prevent this being used to control a motor, as two indicator lights may come on or go out simultaneously without corresponding to the indication of a level.

The device according to the invention is an improvement to the devices comprising communicating vessels. It comprises a tube one end of which is connected to a chamber closed by a large-diameter, flexible and fine diaphragm designed to offer only weak resistance to the liquid it contains. The other end of the tube is connected to a chamber closed by a small diameter diaphragm which is flexible but stretched in order to offer a certain resistance to the liquid displacement. The upper part of the small diaphragm is covered by a dome serving as a stop; the space between the diaphragm and the dome contains air which may be more or less compressed by movements of the diaphragm. This air is conducted to one side of a chamber which itself is separated in two by a diaphragm able to actuate a needle-type switch on each side. The other semi-chamber is connected to a further chamber by a channel in order to ensure that each side of the separating diaphragm contains the same volume of air and situated in such a way that temperature variations act, through the medium of the air, in the same way on both sides of the separating diaphragm. A channel opened or closed by a valve connects the air spaces on either side of the separating diaphragm and enables the said diaphragm to return to its initial position of any time (position where the two switches are opened), whatever the position of the other diaphragms. The valve enables new variations in the liquid level to deform the separating diaphragm and to close or open electrical circuits to control light or audible signals and in this way to indicate the movements to be carried out in the search of horizontally.

These electrical signals may be amplified to enable a microgear motor to turn a tubular socket wrench in the direction required to set at the same level the nuts of the threaded rods serving to hold up suspended ceilings. This tubular socket wrench may be replaced by a screwdriver attachment. This system may be extended to a drill controlled by the levelling device, allowing the depth of holes in a concrete slab to be all the same level, meaning that the threaded rods which come up against the bottoms of these holes are systematically adjusted, thus facilitating the installation of suspended ceilings.

Other features of the present invention will become apparent from a consideration of the following description, taken in connection with the accompanying drawings, in which.

Figure 1:
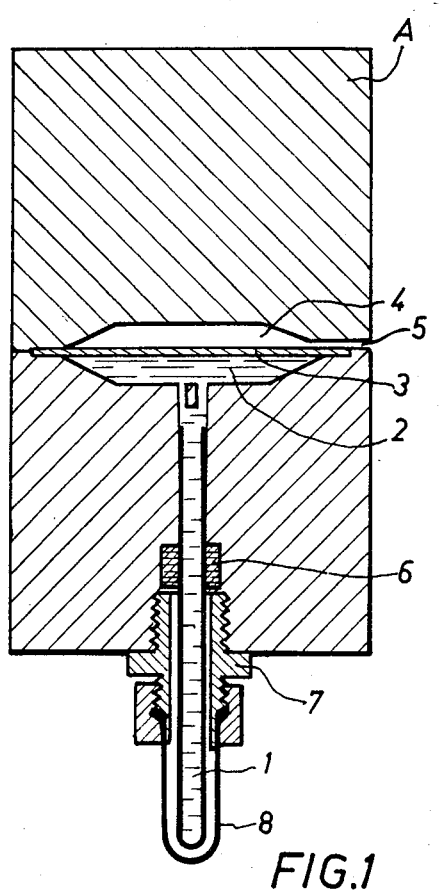
FIG. 1 is an axial section front view of a fixed part of a device according to the invention.
Figure 2:
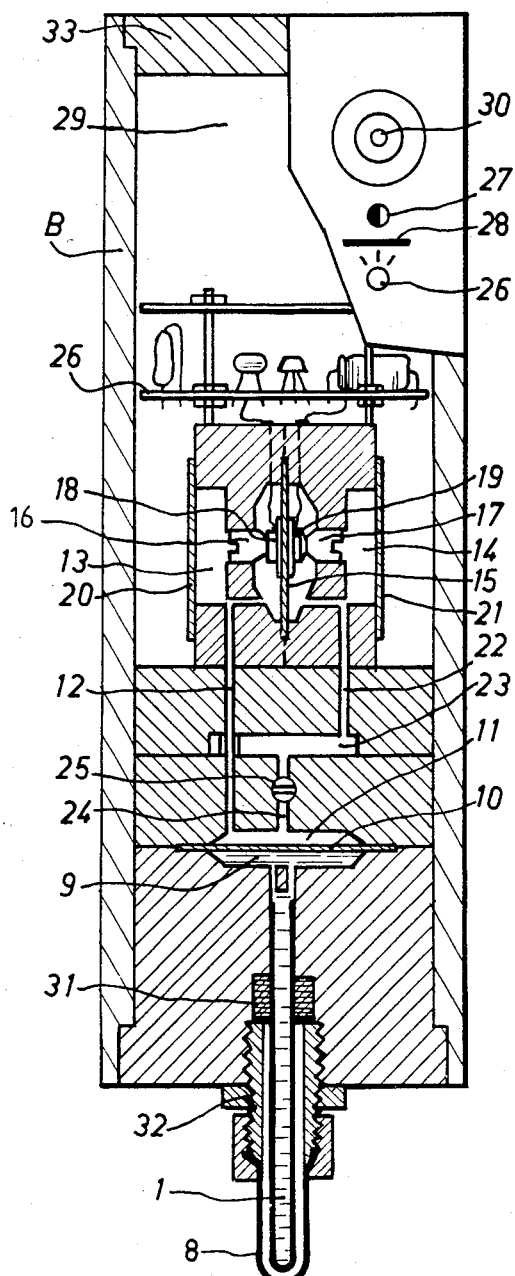
FIG. 2 is an axial section of the device with a view of an upper portion of same.

As shown in FIG. 1, this device comprises a flexible tube (1) connected to one end to an enclosure (A) containing a chamber (2) closed by a large-diameter, fine, flexible and strong diaphragm (3) in order to offer very weak resistance to the liquid contained; a space (4) to limit diaphragm movements, a vent (5), a sealing sleeve (6) clamped by the coupling (7) and a tube (8) protecting the tube containing the liquid (particularly where the liquid is mercury). The other end of the tube (1) is connected to an enclosure (B), as shown in FIG. 2. This enclosure comprises a chamber (9) closed by a diaphragm (10) having a diameter as small as possible and being slightly stretched. The space (11) contains air and limits movements of the diaphragm (10). A channel (12) connects the space (11) to another space separated into two semi-chambers (13,14) by a flexible diaphragm (15) having a diameter as small as possible and being slightly stretched. This diaphragm actuates on each side, an adjustable needle-type switch (16,18) (17,19), each of these elements being electrically connected to an outside source of current. In the rest position, this diaphragm (15) is perfectly flat and the contact switches are therefore opened about 1/100th of a mm. The very taut diaphragms (20,21), which are optional, limit the high pressures on the electrical contacts. The spaces (13,14) must be of the same volume and be subject to thermal variations at exactly the same rate. The excess of air contained in the spaces (11,12) is compensated for by the channel (22) and a chamber (23) located as symmetrically as possible in relation to the channel (12) and the space (11) and as close as possible, in order for the air on each side of the separating diaphragm to be subject as much as possible to the same heat variations.

A channel (24) connects the spaces (11,12,13) to the spaces (14,22,23) and a valve (25) opens or closes the channel (24) to provide a connection between said spaces and optionally with atmospheric pressure. The currents passing through the contact switches (16,18 and 17,19) are very weak and are amplified by an electronic circuit (26) in order to feed the indicator lights (26,27), the required level indicator (28); the battery housing (29), the switch (30), the cover (33) and the sealing sleeve (31) clamped by the coupling (32) are also shown.

The above described device is used as follows: let us assume that a horizontal line is to be drawn represented by the line (34); the enclosure (A) is located approximately at the level of the line (34), the lack of precision required for this operation allowing the enclosure (A) to be kept in a winding drum. The upper part of enclosure (B) is located on the line (34); the device is then electrically connected and the valve (25) is opened and air pressure becomes equalized on either side of the diaphragm (15) and the contact switches (16,18 and 17,19) are opened. Thereafter, the valve (25) is closed. From that moment, all movements of the diaphragm (10) are picked up by the diaphragm (15). If enclosure (B) is lowered with respect to (A), the diaphragm (10) swells and compresses the air in the space (11), this air then being transferred to the semi-chamber (13) where it compresses the diaphragm (15), which closes the circuit (17,19) and causes an indicator light (26) located below the level indicator (28), maining the enclosure (B) should be raised. If enclosure (B) is raised too high with respect to (A), the opposite occurs and the indicator light (27) comes on to show that enclosure (B) should be lowered. In this way, horizontality is achieved when the diaphragm (15) is not subject to any pressure and the contact switches (16,18 and 17,19) therefore remain opened. Then the indicator lights are off, meaning that the required horizontality has been obtained.

Figure 3:
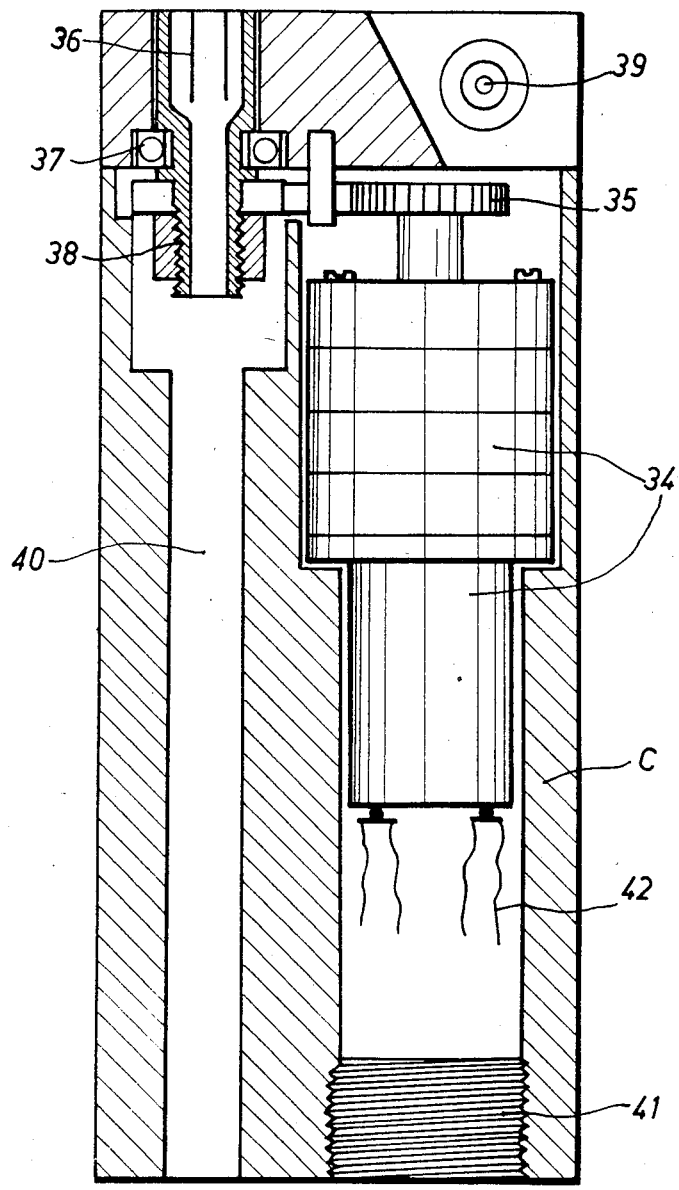
FIG. 3 is a front section of an accessory part of the device.
Figure 4:
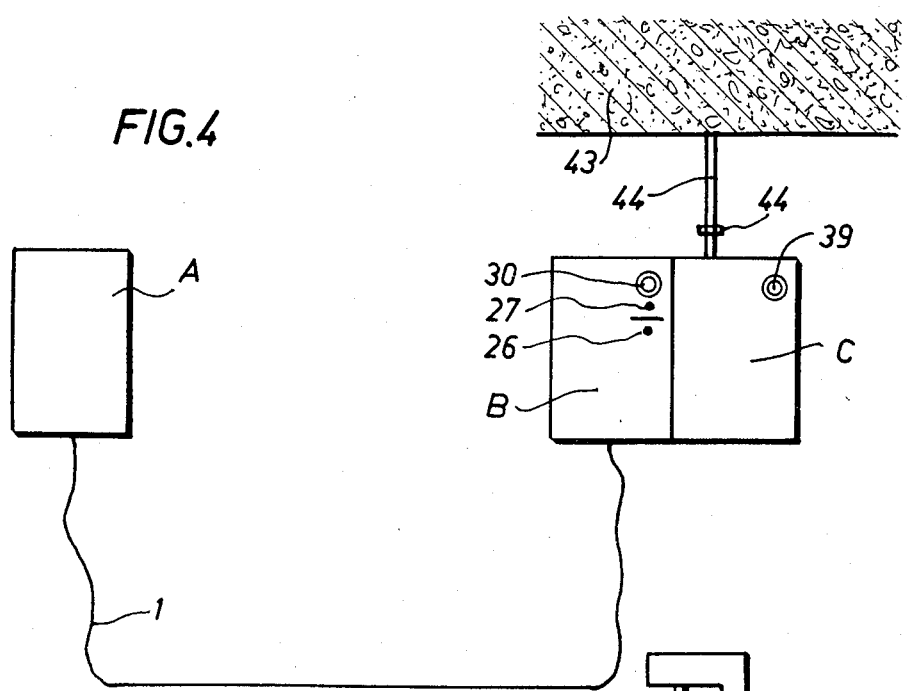
FIG. 4 is a diagrammatic view of the device of the invention in use.

The levelling device can be fitted with a sort of bolting attachments, the micro gear motor of which is controlled by signals generated by the contacts (16,18 and 17,19). For information only, FIG. 3 illustrates such a device, where the housing (C) is fixed to the enclosure (B) and contains the micro gear motor (34), the gears (35) driving a tubular socket wrench (36); on this figure, the ball bearings (37), the locknut (38), the pressure switch (39), the hole (40), through which pass the threaded rods, the plug (41) and the elctrical conductors (42) are also shown. The electrical or electronic circuits are not shown. This apparatus may be battery-operated, using rechargeable batteries, or operated from the electric sector and can be fitted with a variable speed drive. The tubular socket wrench (36) can be removed and replaced by a screwdriver attachment or a drill. FIG. 4, shows one use for this apparatus: here, a suspended ceiling has to be attached by threaded rods to a concrete slab (43). The apparatus automatically sets the nuts (44) at the same level. It afterwards suffices simply to fix a standard bracket by means of a locknut, install the rails and position the panels; the ceiling is perfectly level.

Figure 5:
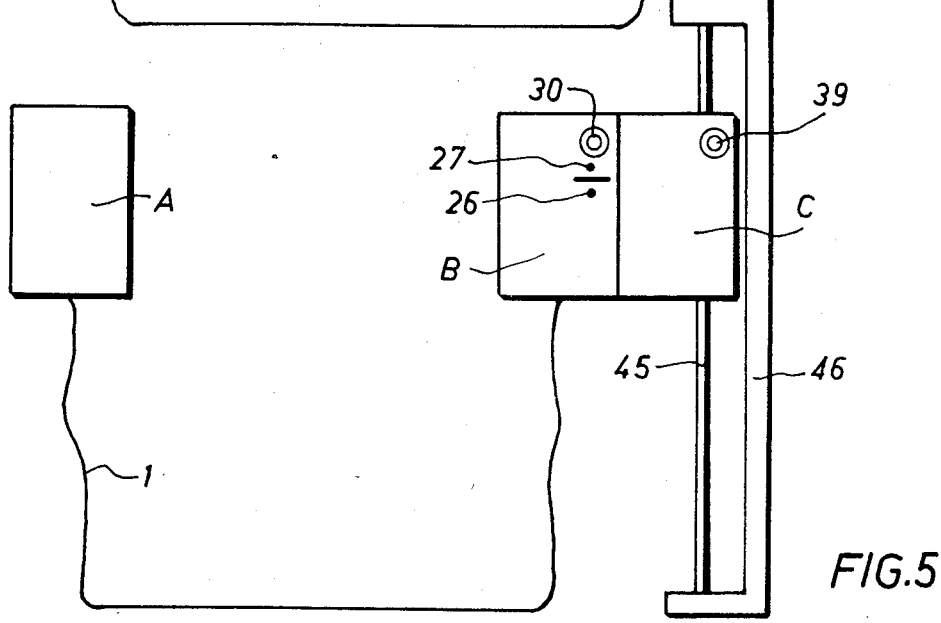
FIG. 5 is a diagrammatic view of the device of the invention according to another use embodiment.

According to another embodiment, the apparatus automatically determines horizontality on its own. FIG. 5 shows an example of this embodiment. A threaded rod (45) fixed to a frame (46) is run over by a relevant bolting attachment. For this, it is sufficient to position the frame (46) approximately at the point required and switch on. The operation is carried out in the same way as the setting of the nuts at the same level.

In another embodiment, this apparatus comprises an enclosure (A), as described in FIG. 1, and several enclosures (B), as described in FIG. 2 and all connected by a tube to enclosure (A). The electrical signals from the various enclosures B are used to control mechanical or hydraulic systems and by the use of jacks for example, can be used to stabilize a platform horizontally. A special leakproof version of this apparatus offers the same functions for submarine works.

Another embodiment, in accordance with the descriptions in FIGS. 1 and 2, has diaphragms (3,10) of the same diameter and spaces (4,11) equal in volume. The diaphragm (15) is here actuated by compressed air through the diaphragm (10) then, inversely, by compressed air through the diaphragm (3), the air being transferred to the semi-chamber (14) through a fine tube. The diaphragm (15) picks up only a difference of pressure, notwithstanding the apparent variations in the liquid. A very fine tube connects the semi-chamber (13) to a chamber similar to chamber (23) but situated in enclosure (A) in the vicinity of the space (4). The very fine tubes (two) pass through the tube (8) and are subject to the same temperature variations.

Another embodiment of the systems described allows the diaphragm (15) to actuate a potentiometric, piezoelectric transducer with a wire strain gauge. Existing devices measure resistance values and their variations serve to detect the moment when the diaphragm (15) is perfectly flat, which corresponds to a given value and to horizontality.

For various reasons, such as ageing, the diaphragm (15) can lose its shape. This problem can be remedied by varying the volume of air from one side to the other of the said diaphragm, by means of a piston or any other similar system.

This apparatus can be operated by just one person to determine required levels or certain settings in the manufacturing and building industries, or wherever levels are required to be determined over distances of 10 to 50 meters, inclusing under water.

I claim:

1. Level device of the type used for masonry work, comprising a first chamber and a second chamber, a flexible tube (1) connected to one end to said first chamber (2) closed by a first diaphragm (3) offering resistance to movements of the liquid contained, the movements of the said first diaphragm (3) limited within a first space (4), the other end of the tube (1) being connected to said second chamber (9) closed by a second diaphragm (10) and being slightly stretched, this second diaphragm (10) having a second space (11) thereabove containing air, a first channel (12) connecting said second space (11) to a third chamber (13) separated from a fourth chamber (14) by another slightly tightened third diaphragm (15) controlling on each side an adjustable needle-type contact switch and each of the elements of which are electrically connected to an outside source of current, this third diaphragm (15) at rest being perfectly flat and maintaining the said contact switches very slightly opened, said third and fourth chambers (13–14) being of the same volume and located in order to be subject to the same temperature variations, the volume of air in said first channel (12) and said second space (11) being compensated for in a manner as equal as possible because of temperature variations through a second channel (22) and a fifth chamber (23), a third channel (24) connecting the various spaces on each side of said slightly tightened third diaphragm (15) and being opened and closed by a valve (25), and electric batteries, a main switch, two indicator lights controlled by needle-type contact switches operated by said third diaphragm (15) which is itself actuated by compressed air through said first diaphragm (10) in relation to the movements of the liquid in accordance with the principle of communicating vessels and connected to the mechanical effects of said first and second diaphragms (3 and 10), a piston moved relative to one of said third and fourth chambers (13 or 14) allowing pressure in these chambers to be corrected with respect to the third diaphragm (15) losing shape.

2. Level device, in accordance with claim 1 wherein a frame is fixed to an enclosure (B) of the levelling device, a tubular socket wrench (36) controlled by an electric gear motor (34) is mounted on said frame (C), current being distributed through relays and any electronic circuit controlled by current passing through contact switches (16, 18) and (17, 19) and allowing the tubular socket wrench to turn in either direction and to set certain parts on a level.

3. Level device in accordance with claim 2, wherein the tubular socket wrench is adapted to run over a threaded rod (45) which is itself fixed to a frame (46).

4. Level device in accordance with claim 1, wherein the third diaphragm (15) actuates a potentiometric transducer connected to reading means.

5. Level device in accordance with claim 1 wherein the level is made up of several enclosures (A and B).

6. Level device in accordance with claim 1 comprising two very taut diaphragms closing the corresponding third and fourth chambers (13-14) and limiting the pressure on the needles and caps of the corresponding contact switches (16, 18 and 17, 19).

7. Level device in accordance with claim 1 wherein said first and second diaphragms (3 and 10) are identical in size, as are the corresponding first and second spaces (11 and 4) the air compressed by the first disphragm (3) passing through a very fine tube to the corresponding fourth chamber (14) and compressing one side of the corresponding third diaphragm (15), the air compressed by the second diaphragm (10) being transferred to the corresponding third diaphragm, the latter third diaphragm (15) therefore detecting only the difference in pressures exerted, another very fine tube running from the corresponding third chamber (13) to a chamber situated in an enclosure (A), in order that the air volumes and spaces on each side of the third diaphragm (15) are identical and positioned symmetrically so that the temperature variations are the same on each side of the third diaphragm (15).

8. Level device in accordance with claim 1 wherein a valve (25) enables, during use of this level, said enclosure (A) to be positioned approximately at the reference point, therefore allowing this enclosure to be kept in a winding drum with a single marker.

9. Level device, in accordance with claim 1 wherein a frame is fixed to an enclosure (B) of the levelling device a screwdriver and drill attachments controlled by an electric gear motor (34) is mounted on said frame (C), current being distributed through relays and any electronic circuit controlled by current passing through contact switches (16, 18) and (17, 19) and allowing the screwdriver and drill attachments to turn in either direction and to set certain parts on a level.

* * * * *